Sept. 4, 1928.
W. M. VENABLE
1,682,872
METHOD OF AND APPARATUS FOR HANDLING, STORING, AND
MEASURING BULK MATERIAL INTO BATCHES
Filed June 3, 1924   3 Sheets-Sheet 1
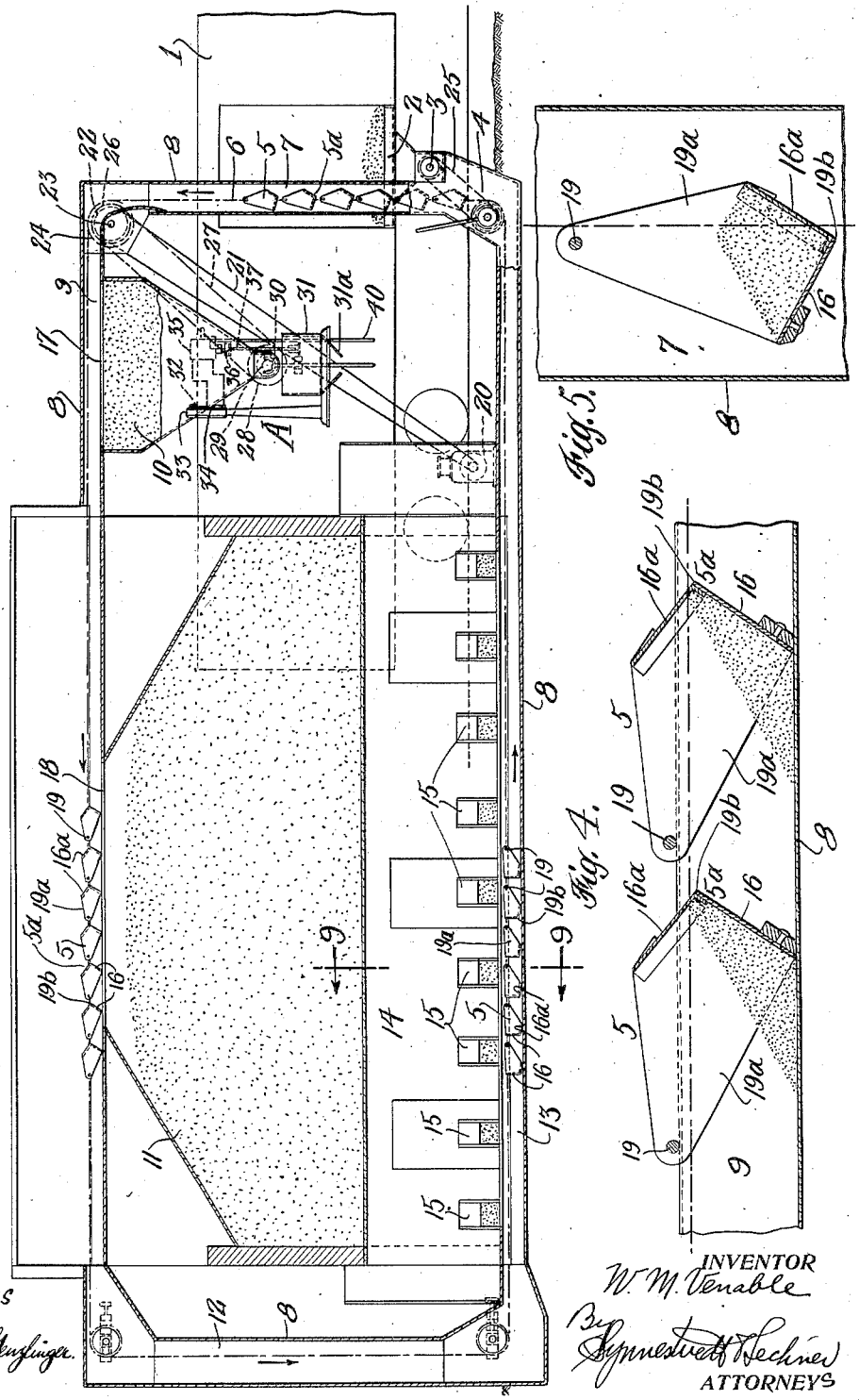
WITNESS
Gustav Genzinger
INVENTOR
W. M. Venable
By Synnestvedt & Lechner
ATTORNEYS

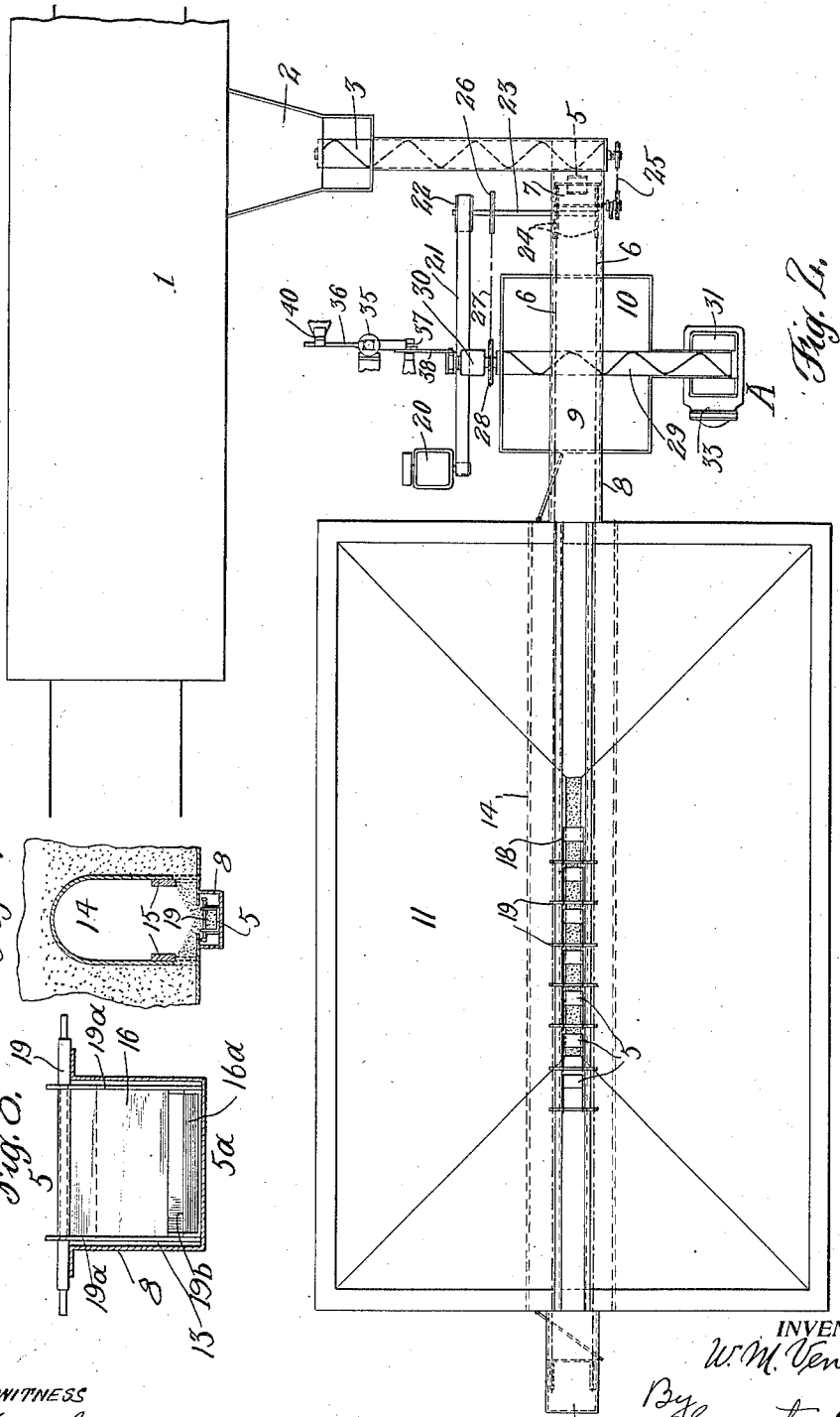

Sept. 4, 1928. 1,682,872
W. M. VENABLE
METHOD OF AND APPARATUS FOR HANDLING, STORING, AND
MEASURING BULK MATERIAL INTO BATCHES
Filed June 3, 1924   3 Sheets-Sheet 3
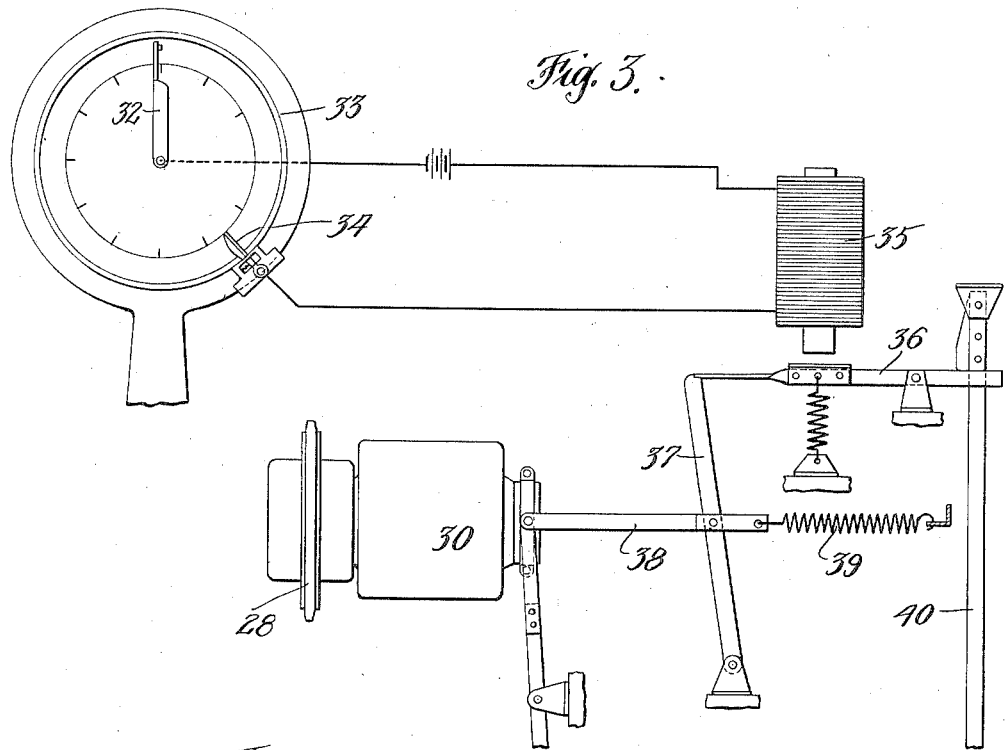
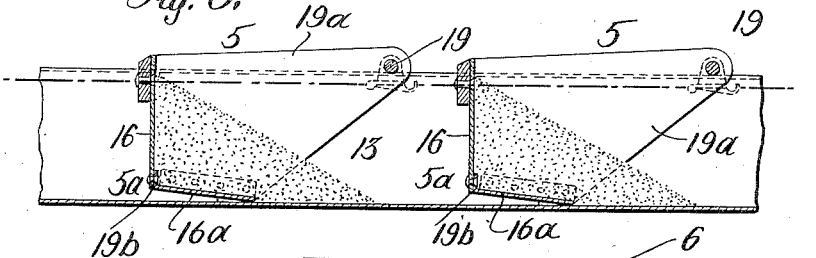
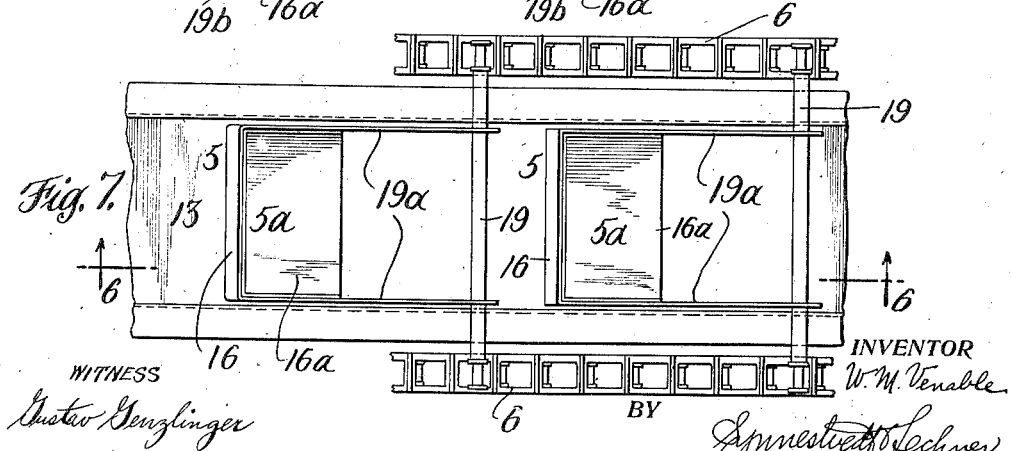
WITNESS
Gustav Genzlinger
INVENTOR
W. M. Venable
BY
Synnestvedt & Lechner
ATTORNEYS Patented Sept. 4, 1928.

1,682,872

UNITED STATES PATENT OFFICE.

WILLIAM MAYO VENABLE, OF PITTSBURGH, PENNSYLVANIA, ASSIGNOR TO BLAW-KNOX COMPANY, A CORPORATION OF NEW JERSEY.

METHOD OF AND APPARATUS FOR HANDLING, STORING, AND MEASURING BULK MATERIAL INTO BATCHES.

Application filed June 3, 1924. Serial No. 717,535.

My invention relates to a method of and apparatus for handling, storing and measuring bulk materials, the particular material used in connection with the apparatus I will describe being cement, although the apparatus adapts itself just as readily to many other materials. I aim to economically handle and measure out bulk material into batches, to arrange the various parts of the apparatus for efficient operation, and to eliminate waste whereby the use of bulk material is made cheaper, more practicable, more convenient and less dusty. I aim also to provide an apparatus in which uniform quantities of material of any predetermined value may be accurately measured out from a source of bulk material and in which the amount to be measured may be varied as desired. The parts of the device are serially arranged in such a manner that measuring out batches may continue even should the source of supply be cut off or should the associated mechanism fail.

The desirability of handling material such as cement, in bulk, has been demonstrated by contractors occasionally shipping it in bulk, without sacks or containers and in measuring into batches at the job. However, this practice has not hitherto become general, owing to difficulties in handling, storing and measuring the cement. The more common practice, however, prior to my invention has been to use cement that has been weighed and sacked, a sack supposedly containing 1 cubic foot by bulk measurement and weighing about 97 pounds. In making concrete the general practice has been to specify the proportions of the mixture of the various ingredients by volume on the basis of the contents of a sack (1 cu. ft.). My invention makes it feasible to measure out accurately quantities of cement not necessarily multiples of 1 cubic foot as has hitherto been the practice, and to accomplish such measuring rapidly either in uniform amounts or in varying amounts.

The economy of handling cement in bulk, may well be realized when the cost of bagging is taken into consideration. The cost of the cloth sacks used for bagging cement, at present day prices, runs to about one fourth of the cost of the cement they contain. In addition is added the cost of cleaning, packing, shipping, accounting for empty sacks to be returned to the mill, extra freight both going and coming and sack losses and depreciation, all of which are eliminated by the use of my apparatus.

I provide a complete equipment for taking cement from the point of unloading, to the place of measurement, or to storage, or to take it from storage to measurement, and for conveniently dumping the measured batch into a mixer or truck with practically no rehandling.

How these and other advantages can be realized through my invention will appear from my description hereinafter of the best way of carrying out the invention known to me.

In the drawings Fig. 1 is a longitudinal section thru a system of apparatus convenient for the purposes of my invention;

Fig. 2 is a plan view of the apparatus;

Fig. 3 is a diagrammatic view of the weighing device used in connection with my apparatus;

Fig. 4 is an enlarged sectional view of a portion of the endless conveyor, showing the position of the conveyor elements or buckets when in the upper stretch of the enclosing channel;

Fig. 5 is an enlarged sectional view of a portion of the endless conveyor, showing the position of the conveyor elements or buckets when in the upright stretch of the enclosing channel;

Fig. 6 is an enlarged sectional view of a portion of the endless conveyor taken on line 6—6 of Fig. 7 and showing the position of the conveyor elements or buckets when in the lower stretch of the enclosing channel;

Fig. 7 is a plan view of Fig. 6;

Fig. 8 is an end view of Fig. 6 looking toward the left, and Fig. 9 is a detailed section taken on line 9—9 of Fig. 1.

The car containing the bulk material is indicated at 1, from which the material is fed over the gang way or removable apron 2, to screw conveyor 3 extending transversely of the apparatus, which conveyor discharges the material into the compartment 4, where it is picked up by the conveyor elements or buckets 5 of the endless conveyor 6 and carried in upward flight thru the upright stretch 7 of the dustproof enclosing channel 8. The conveyor then takes a substantially horizontal course thru the upper stretch 9 of the channel 8 in the direction of the arrow, the material in the conveyor elements being discharged by gravity into the charging bin or hopper 10 which, in this instance, is shown of limited size where it accumulates until drawn off by the measuring device indicated as a whole by the reference character A. When the charging hopper becomes filled with material, the surplus is drag scraped along by the conveyor elements or buckets 5 and discharged by gravity into the storage bin 11, which may be of a capacity to hold several carloads of material. The buckets then take a downward course thru the stretch 12 of the enclosing channel 8, then a substantially horizontal course thru the lower stretch 13 to the place of beginning.

It will be seen that by this arrangement the material is handled and deposited at the various stations while being continuously fed to the apparatus from the source of supply, the surplus when the charging hopper 10 is full being carried over to the storage bin 11. After the source of supply is exhausted or shut off for any reason, the charging hopper is supplied or recharged with material from the storage bin in a manner which will appear hereinafter. Extending thru the lower part of the storage bin 11 is a tunnel 14 having doors at either end so that the operator may enter the tunnel and have access to the material in the bin. I have provided doors or gates 15 in the walls of the tunnel 14 which when opened allow material to fall in the path of the conveyor. This material is scooped along and then lifted up and finally discharged into the hopper 10. Thus it will be seen that by this recharging means the charging hopper is recharged with material from the storage bin so that weighing off batches may continue without interruption while waiting for a new supply.

The convenient construction of the conveyor elements forms an important part of this invention, it being apparent that ordinary buckets would not function to perform the various duties required of them in making the circuit, namely of acting as buckets in their upward flight in the upright stretch of the channel, of acting as drag scrapers discharging the material by gravity and scraping along surplus material in their horizontal flight along the upper stretch and of acting as scoops to scoop and pick up material discharged from the storage bin in their horizontal flight along the lower stretch. When traveling upward the conveyor elements are in a pendant position and act as ordinary buckets, best shown in Fig. 5. When traveling in a horizontal plane in the direction of the arrow, along the upper stretch they lean on one face as best shown in Figs. 1 and 4, the slope of the scraping face 16 being such that the material will discharge by gravity when they pass over the opening 17 in the charging hopper and the opening 18 in the storage bin. When traveling in a horizontal plane in the direction of the arrow, along the lower stretch they lean on the other face as best shown in Figs. 1 and 6, the faces 16 and $16^a$ forming a scoop. As shown the conveyor consists of two ordinary link sprocket chains spaced apart with the conveyor elements mounted between them by means of the shafts or pivot pins 19.

In the particular construction shown the conveyor elements 5, comprise sides $19^a$ and a pocketed body $5^a$ of V shape mounted to swing on the pivot pin 19 away from the direction of travel. It is to be noted that the face 16 of the V is arranged at such angle with respect to the plane passing thru the pin 19 and the apex $19^b$ of the V body as will cause the face 16 to act as a drag scraper when traveling horizontally with the face 16 down; while the other face $16^a$ is at such angle with said plane as will cause it to act as a scoop when traveling horizontally with this face down.

As a simple and convenient drive for the various conveyors I have shown but a single engine or motor 20 connected by the belt 21 to the pulley 22 mounted on the shaft 23 which also carries the sprockets 24 for the chains of the conveyor, similar sprockets being provided at each of the corners of the rectangular channel 8 for guiding the chain. The conveyor 3 in this instance is driven from the lower right hand sprocket shaft by means of a chain 25. I have provided a clutch on this shaft so that the conveyor 3 may be stopped and started at the operator's will. The shaft 23 has another sprocket 26 secured thereto which thru the medium of the chain 27 and sprocket 28 drives the feed screw 29 which feeds material from the charging hopper 10 to the measuring device A. It is to be understood, however, that the various conveyors might be driven separately without departing from the principles of this invention.

The measuring device A which I prefer is a scale for weighing the batch, although a bulk measuring device might be used in some instances. Furthermore I have shown a dial scale although in some cases it may be found more convenient to use a beam scale. The operation of the measuring device is as follows: The feed screw 29 is started by throwing in the hand operated clutch 30 which feeds material from the charging bin or hopper 10 to the container 31, and continues to feed until the pointer 32 of the scale 33 (see Fig. 3) makes contact with contact member 34 which is set adjacent the marking on the scale dial indicating the required amount of material desired to be measured out. The container 31 is provided with gates 31ª for discharging the measured batch. Making of the contact completes a circuit that energizes the electromagnet 35 which attracts the bar 36 and releases the lever 37 which is connected to the clutch 30 by means of link 38. When the lever 37 is thus released the spring 39 pulls the clutch out of engagement, stopping the feed screw until the operator again throws in the clutch. I have shown an emergency lever 40 which may be operated to release the lever 37 should it be desired to disconnect the magnet temporarily or to weigh out batches short of the set weight. The contact member is capable of adjustment and may be set to measure out varied quantities of material.

In brief the measuring device is a device capable of being started by hand and of being automatically stopped when a predetermined amount of material is measured out, with means for measuring short batches if desired without interfering with the setting of the automatic stopping means.

It is to be understood that while I have shown the complete invention in one preferred arrangement, many variations may be made as pointed out from time to time in the specification or as convenience and space may necessitate without departing from the scope of this invention.

I claim:

1. Apparatus for handling, storing and apportioning bulk material, comprising in combination a source of supply, a charging hopper, a measuring device, a storage bin, an endless conveyor for distributing the material, a conveyor for delivering material from the source of supply to the endless conveyor, a conveyor for delivering material from the charging hopper to the measuring device and a common drive for the various conveyors.

2. Apparatus for handling, storing and apportioning bulk material, comprising in combination a source of supply, a charging hopper, a measuring device, a storage bin, an endless conveyor for distributing the material, a conveyor for delivering material from the source of supply to the endless conveyor, a conveyor for delivering material from the charging hopper to the measuring device, means for disconnecting the source of supply and means for disconnecting the last mentioned conveyor.

3. Apparatus for handling, storing and apportioning bulk material, comprising in combination a source of supply, a charging hopper, a measuring device, a storage bin, an endless conveyor for distributing the material, a conveyor for delivering material from the source of supply to the endless conveyor, a conveyor for delivering material from the charging hopper to the measuring device, means for disconnecting the source of supply and means automatically controlled by the measuring device for disconnecting the last mentioned conveyor.

4. Apparatus for handling, storing and measuring bulk material into batches comprising in combination with a source of supply, a charging hopper, a storage bin, a measuring device and an endless conveyor for distributing the material, a tunnel thru the lower part of the storage bin having end doors for passage thru the tunnel, one of said doors being adjacent the measuring device, and gate controlled openings in the tunnel walls for discharging material from the storage bin.

5. Apparatus for handling, storing and measuring bulk material into batches comprising, in combination, a source of supply, a charging hopper, a storage bin, and an endless conveyor for charging the hopper to full capacity prior to conveying the surplus material to the storage bin, the charging hopper being located intermediate the source of supply and the storage bin.

6. Apparatus for handling, storing and measuring bulk material into batches comprising in combination with a source of supply, a charging bin for receiving material from the source of supply, a storage bin for receiving the surplus material from the charging bin, means for conveying material from the storage hopper to the charging bin, a measuring device, means for feeding material from said hopper to said measuring device, and means operable to automatically interrupt said feeding means when the material in said measuring device reaches a predetermined amount.

7. Apparatus for handling, storing and measuring bulk material into batches comprising in combination with a source of supply, a charging bin, means for keeping the charging bin filled with material, a storage bin for receiving surplus material from the charging bin, a weighing device for weighing off uniform batches of material, means for uniformly feeding material from the charging bin to the weighing device and adjustable means on the weighing device for shutting off the feeding means when the desired amount of material is weighed off.

8. In an apparatus for handling and measuring bulk material into batches the combination with the source of supply of a measuring device, a charging bin, means for introducing material from the source of supply to the charging bin, means including a feed screw for supplying material from the bin to the measuring device, hand controlled means for starting the feed screw, and means for stopping the feed screw, said means being operable to stop said feed screw when the material in said measuring device reaches a predetermined amount.

In testimony whereof I have hereunto signed my name.

WILLIAM M. VENABLE.